United States Patent Office 3,578,706
Patented May 11, 1971

3,578,706
REMOVAL OF BROMINE-CONTAINING IMPURITIES FROM AQUEOUS ACETIC ACID
Ferdinand List and Helmut Alfs, Marl, Germany, assignors to Chemische Werke Huels A.G., Marl, Germany
No Drawing. Filed Oct. 18, 1967, Ser. No. 676,022
Claims priority, application Germany, Oct. 27, 1966, C 40,534
Int. Cl. C07c 63/02
U.S. Cl. 260—524                    7 Claims

ABSTRACT OF THE DISCLOSURE

In the working-up of acetic-acid-containing byproducts mixtures derived from processes directed to the liquid-phase air oxidation of alkyl aromatics in the presence of bromide anions, the improvements of treating such mixtures with metals or inorganic compounds thereof having electrochemical potentials ranging from magnesium to iron in order to convert organically bound bromide to bromide anions, and then subjecting the reaction mixture to ion exchange to remove substantially all the bromide ions, thereby eliminating the corrosiveness of the mixture and permitting the utilization of considerably less expensive materials of construction for the distillation system and other apparatus.

PRIORITY PARAGRAPH

Applicants hereby claim the benefit of the filing date of German patent application C 40,534 IBb/12 o, filed Oct. 27, 1966, pursuant to the provisions of 35 U.S.C. 119.

BACKGROUND OF THE INVENTION

This invention relates to a process for the removal of bromine-containing impurities from aqueous acetic acid, and in particular to the removal of bromine compounds from the aqueous acetic acid by-product stream obtained from the liquid-phase oxidation of alkyl aromatics with air.

Impure residual aqueous acetic solution is obtained after the removal of the oxidation product in a process comprising the liquid-phase high-temperature air oxidation of alkyl aromatics, such as p-xylene, dissolved in an acetic acid solution in the presence of manganese salts or cobalt salts. This process, as exemplified in U.S. Pat. 2,245,528, can also be conducted in the presence of a heavy metal bromide (U.S. Pat. 2,276,774), or hydrogen bromide, or a compound forming hydrogen bromide during the reaction (British Pat. 578,608), and it is to such bromide-containing reaction mixtures that this invention is directed. Normally, after separating the crude oxidation product, for example terephthalic acid, the reaction mixture is worked up by withdrawing from the reactor a mixture of acetic acid, unreacted p-xylene, and condensed-out water. This mixture is withdrawn either batchwise or in a continuous manner as overhead by-product.

Since this overhead by-product contains valuable starting materials for the oxidation process—acetic acid and p-xylene—an additional separation step must be conducted. Towards this end, the mixture is distilled into an overhead azeotrope of xylene and water and an anhydrous acetic acid bottoms product. The xylene is separated from the water in a conventional decanter, the water being discarded. This continuous removal of the reaction water is of particular importance, since higher water concentrations in the reaction mixture can completely inhibit further oxidation.

The overhead by-product, however, also contains significant amounts of entrained bromine compounds, and such compounds provide a highly corrosive environment even when employing conventional chemically resistant metals, such as copper, stainless steels, or other corrosion-resistant alloys, e.g., V2A, V4A, Monel metal, and "Everdur" (a group of copper-silicon alloys), etc. In this connection, not only is the metal pitted severely leading to serious damage to the apparatus, but also the oxidation process is itself detrimentally affected, due to the effect of the dissolved metals.

It is known from German Auslegeschrift (published application) 1,087,589 that, based on one kg. of reaction solution, iron concentrations of 300 mg. strongly inhibit the reaction, and 1,000 mg./kg. of reaction solution completely blocks same. If stainless steels are employed, such iron concentrations are quickly built up. In addition, the copper ion concentration must not rise substantially above 150 p.p.m. Consequently, if acetic acid is worked up in apparatus made of the aforementioned materials, it cannot be directly recycled into the oxidation process.

Whereas other materials of construction, such as titanium, tantalum, zirconium, silver, and Hastelloy (an alloy of nickel, molybdenum, and chromium) can be used to offset the corrosive effect of the bromine compounds, these materials are so expensive that the economics of recovering and recycling the acetic acid are marginal.

As a consequence of this dilemma, an attempt was made to remove the bromine compounds by ion exchange, but this was also ineffective, because the resultant solution remained highly corrosive.

SUMMARY OF THE INVENTION

A principal object of this invention is, therefore, to provide an improved method of working up the by-product acetic acid stream obtained from the air oxidation process of alkyl aromatics in the presence of bromides. A more particular object is to reduce the corrosiveness of such by-product streams to such a degree that reasonably priced materials of construction can be employed for the distillation system etc.

A further object is to remove the corrosion-causing bromine compounds from the by-product stream.

Upon further study of the specification and claims, other objects and advantages of the present invention will become apparent.

These objects are attained, in accordance with the invention, by stirring the by-product mixture at elevated temperature with finely divided metals located in the electromechanical series of elements (hydrogen being 0.00) between magnesium and iron, inclusive, or the oxides, hydroxides, or salts thereof; subjecting the resultant mixture to ion exchange treatment utilizing anion exchange resins; and then separating the anion-exchanged mixture by distillation in a conventional manner.

DETAILED DISCUSSION OF THE INVENTION

The by-product mixture, when a p-xylene-air oxidation is continuously conducted in the presence of acetic acid, of cobaltous and bromide ions brought into the mixture in form of cobaltous acetate (0.3 g./l. of the mixture) and barium bromide (0.15 g./l. of the mixture) at a temperature of about 180–190° C. and a pressure of 10–20 atmospheres gauge, has the following approximate composition:

Acetic acid—91%
Water—8%
p-Xylene—1%
Total bromine (organic+inorganic)—70 mg.[1]
Bromine (inorganic)—20 mg.[1]

[1] Per kg. of overhead product.

The composition of these mixtures can vary, of course, depending upon the conditions of the oxidation and the process as a whole, with respect to the ratio of acid to water and alkyl aromatic, as well as with respect to the total bromine proportion and the relative proportions of organically and inorganically bound bromine.

It has been discovered that during distillation the organic bromine compounds decompose, yielding inorganic bromide ions, and that for an effective corrosion-free process, it is necessary to remove all bromine from the by-product solution. To do this, the organically bound bromine is converted to bromide, and the resultant solution is ion-exchanged to remove all the bromide ions.

The first step of the process is preferably conducted at 30–118° C., but higher or lower temperatures can be used, if desired. Particularly preferred is the boiling temperature of the mixture.

With respect to the metals that can be employed in the first step, the series of elements in accordance with electrochemical potentials mentioned above is understood to be the tabulation in Smith-D'Ans, "Einführung in die allgemeine und anorganische Chemie" (Introduction to General and Inorganic Chemistry), XIth edition (1947), G. Braun Publishers, Karlsruhe, Germany, page 634. Preferred metals are magnesium, aluminum, manganese, zinc, and iron.

The above-mentioned metals are distinguished by the fact that they produce, in the form of their salts, organic acid-complexes with all types of solvents. (See F. Hein, "Chemische Koordinationslehre" (Teachings on Chemical Coordination), S. Hirzel Publishers, Leipzig, Germany, 1950, page 303.)

To accelerate the reaction, the metals should be present in a finely divided form, for example as a powder, or as fine chips.

In place of the metals, it is also possible to employ the oxides and hydroxides thereof, for example, aluminum hydroxide or zinc oxide. Furthermore salts, such as aluminum chloride, aluminum bromide, iron(II) bromide, iron (II) chloride, and zinc chloride.

The metals or the compounds thereof are preferably employed in amounts of between 0.1 and 20 g., more preferably between 0.5 and 5 g., based on 1,000 g. of solution to be worked up. For this treatment, sufficient time is used to convert all organic bromine atoms to bromine anions, a time period of 0.1 to 1 hour being usually required, depending upon the bromine content of the mixture, temperature, and the type, amount, and distribution of the metal or the metal compound. The end of the reaction can be recognized by the fact that the entire bromine quantity, when titrating with $AgNO_3$ in a nitric acid solution, is detected quantitatively as bromide.

Suitable anion exchange resins are commercial products, for example, the substances known under the trade names of PERMUTIT ES, LEWATIT MIH, and WOLFATITE. The basic constituents of these exchange resins are condensation and polymerization products into which active basic groups have been incorporated. The specific nature of the anion exchange material is not of the essence of this invention, as any resin capable of exchanging bromide ions will be satisfactory.

Subsequent to this purification step, the resultant by-product solution can be distilled in the absence of a serious corrosion problem, It being possible to employ conventional columns made of copper, V2A or V4A, or Monel metal.

Without further elaboration, it is believed that one skilled in the art can, using the preceding description, utilize the present invention to its fullest extent. The following preferred specific embodiments are, therefore, to be construed as merely illustrative, and not limitative, of the remainder of the specification and claims in any way whatsoever.

EXAMPLE 1

In the overhead product from the catalytic air oxidation of p-xylene, as described previously, 70 mg. bromine, in total, per kg. of solution are contained. Of this amount, 20 mg. are present in the form of ionically bound bromine.

1,000 g. of this solution are mixed with 5 g. iron filings, heated under stirring at the boiling temperature for 40 minutes. Chemical analysis conducted thereafter indicated that the entire amount of bromine (70 mg.) had been converted to an inorganically bound form.

The thus-treated solution is passed through an ion exchange column (diameter 30 mm., capacity 100 cm.$^3$) at a rate of 0.5 l./h. The ion exchange column is filled with, for example, PERMUTIT ES in the acetate form. After passing through the column, the bromine content of the overhead product is <0.1 mg./kg.

After a throughput of 20 l./100 cc. of exchanger, no bromine can be detected by conventional analytical methods. The exchanger can be readily regenerated with a solution of sodium hydroxide, and by a post-washing step with acetic acid, the acetate form is restored.

EXAMPLE 2

1,000 g. of the overhead product described in Example 1 are mixed with 1 g. magnesium and heated to the boiling temperature under stirring for about 20 minutes. In this procedure, the metal is dissolved, and the entire bromine content is converted to the inorganically bound form.

The further processing of this solution is conducted as in Example 1.

EXAMPLE 3

1,000 g. of the overhead product described above are mixed with 1 g. iron(II) bromide and heated for about 30 minutes under stirring to the boiling temperature. The iron bromide is dissolved, and the entire bromine of the starting solution is converted to inorganically bound bromine ions. The processing is conducted as in Example 1.

EXAMPLE 4

If the overhead product employed in Example 1 is directly passed through the ion exchange column, without the metal treatment step, no bromine ions can be detected, but the organically bound bromine remains in the initial concentration of 50 mg./kg.

If the thus-pretreated mixture is subsequently heated up in a stainless steel (V2A or V4A) apparatus, for the purpose of distilling this mixture, ionically bound bromine becomes evident after a very short period of time, and at a concentration substantially corresponding to the original one (inorganic bromine: 20 mg.). This means that without the metal treatment step, an ion exchange step is ineffective towards eliminating the corrosion problem.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a process comprising the steps of: (A) oxidizing an alkyl aromatic compound with air, said compound being dissolved in acetic acid and being in the presence of bromide ions and heavy metal salts; (B) recovering and separating resultant oxidized alkyl aromatic compound; and (C) distilling resultant residual acetic acid solution containing water, unreacted alkyl aromatics, and bromine, the improvement which comprises the steps intermediate steps (B) and (C) of:

(1) reacting said residual acetic acid solution with a member selected from the group consisting of elements having electrochemical potentials between magnesium and iron, inclusive, oxides thereof, hydroxides thereof, and salts thereof for a sufficient time to convert substantially all organic bromine atoms to anionic bromine, and (2) passing the resultant solution through an anion exchanger to remove substantially all bromine anions.

2. A process as defined by claim 1 wherein said member is selected from the group consisting of magnesium, aluminum, manganese, zinc, and iron.

3. A process as defined by claim 1 wherein step (1) is conducted at 30–118° C.

4. A process as defined by claim 1 wherein said member is selected from the group consisting of iron, magnesium, and iron(II) bromide.

5. A process as defined by claim 1 wherein said member is employed in amounts of 0.1–20 g. per 1,000 g. of said residual solution, and said reaction time is 0.1–1 hour.

6. A process as defined by claim 5 wherein said member is employed in amounts of 0.5–5 g., and step (1) is conducted at the boiling temperature of said solution.

7. A process as defined by claim 1 wherein said heavy metal salts comprise cobaltous and barium ions.

References Cited

UNITED STATES PATENTS 3,299,125   1/1967   Ichikawa _____ 260—524

OTHER REFERENCES

Calmon et al.: Ion Exchangers in Organic and Biochemistry, 1957, pp. 109–110 (chapter by Kressman) and 56–57 (chapter by Kitchener).

Moore: Physical Chemistry, 4th ed., 1963, p. 393.

LORRAINE A. WEINBERGER, Primary Examiner

R. S. WEISSBERG, Assistant Examiner